United States Patent [19]
Cohn

[11] 3,972,727
[45] Aug. 3, 1976

[54] RECHARGEABLE BATTERY WHICH COMBATS SHAPE CHANGE OF THE ZINC ANODE

[75] Inventor: Ernest M. Cohn, Washington, D.C.

[73] Assignee: The United States of America as represented by the Administrator of the National Aeronautics and Space Administration, Washington, D.C.

[22] Filed: Aug. 13, 1975

[21] Appl. No.: 604,374

[52] U.S. Cl. .................................. 136/30; 136/143
[51] Int. Cl.² .......................................... H01M 4/38
[58] Field of Search .............. 136/30, 31, 125, 142, 136/143

[56] References Cited
UNITED STATES PATENTS

| | | | |
|---|---|---|---|
| 3,226,260 | 12/1965 | Drengler | 136/30 |
| 3,505,115 | 4/1970 | McBreen | 136/30 |
| 3,672,998 | 6/1972 | Dailand, Jr. | 136/30 |
| 3,876,470 | 4/1975 | McBreen | 136/30 |

Primary Examiner—John H. Mack
Assistant Examiner—C. F. LeFevour
Attorney, Agent, or Firm—Nina M. Lawrence; John R. Manning; Gary F. Grafel

[57] ABSTRACT

A rechargeable cell or battery is provided in which shape change of the zinc anode is combatted by profiling the ionic conductivity of the paths between the electrodes so that ion flow is greatest at the edges of the electrodes and least at the centers thereof, thereby reducing migration of the zinc ions from edges to the center of the anode. A number of embodiments are disclosed, wherein the strength and/or amount of electrolyte, and/or the number and/or size of the paths provided by the separator between the electrodes, are varied to provide the desired ionic conductivity profile.

8 Claims, 5 Drawing Figures

RECHARGEABLE BATTERY WHICH COMBATS SHAPE CHANGE OF THE ZINC ANODE

ORIGIN OF THE INVENTION

The invention described herein was made by an employee of the United States Government and may be manufactured and used by or for the Government of the United States of America for governmental purposes without the payment of any royalties thereon or therefor.

FIELD OF THE INVENTION

The present invention is related to secondary or rechargeable cells or batteries and concerns an improved technique for combatting electrode shape change.

BACKGROUND OF THE INVENTION

A serious problem associated with zinc electrodes used in rechargeable batteries is the tendency of the active material of the electrode, viz., the zinc, to migrate from the periphery of the electrode to the center. This redistribution of the zinc, which is often termed "shape change", not only renders the edges of the zinc electrodes inactive (so-called "edge corrosion") but also reduces activity at the center of the electrode by causing densification of the zinc at the center.

A good discussion of the problem of "shape change" and various techniques for combatting this problem is found in U.S. Pat. No. 3,493,434 (Goodkin). A further patent which deals with this problem in U.S. Pat. No. 3,669,746 (Devitt et al).

The Goodkin patent is of particular interest because of the concern therein with transporting the zinc from the outer edge of the electrode to the center thereof so that, in accordance with a first embodiment, the zinc is deposited in a concave depression in the center which is specifically designed to receive replated zinc. In a second embodiment, the concentration or density of the zinc is increased in a region near the periphery of the electrode and is reduced towards the center, so as to lessen the effect of the zinc which migrates from the edge to the center and reduce densification at the center.

SUMMARY OF THE INVENTION

The present invention is concerned with combatting shape change in the zinc electrodes of a rechargeable battery by profiling the conductivity of the path between the electrodes so that it is easier for ions to travel at and near the edges of the electrodes and more difficult for the ions to travel in and near the center of the electrodes. Thus, rather than accepting substantial migration of the zinc from the edges to the center of the electrodes and compensating for this migration by increasing the amount or the density of the zinc at the edges, as is done in the Goodkin patent discussed above, the present invention is concerned with preventing or reducing this migration of zinc ions toward the center by controlling the ionic conductivity of the path between electrodes. It is noted that in the embodiment disclosed in the Goodkin patent wherein a central cavity or recession is provided, the ion flow could be greater in the center where the cavity was filled with a strong electrolyte. In contrast, in accordance with the invention, current is deliberately encouraged to flow to edges of the electrodes, rather than to the center, so as to minimize shape change.

According to a first embodiment of the invention, the amount or thickness of the separator material is profiled so that the density or thickness of the separator is greatest at the center of the electrodes and least at the edges, so that the flow path for the ions in the electrolyte is easier and more direct at the edges of the electrodes. In a second embodiment, a porous separator is used which is constructed so that the pores therein are concentrated at the edges and that there are relatively few pores at the center. A similar effect is produced in a third embodiment by the use of a porous separator constructed so as to include relatively large pores at the edges and relatively small pores at the center. In another embodiment, a separator arrangement is provided which defines a series of chambers containing electrolytes of different strengths, the strengths of the electrolytes being greatest at the edges and becoming progressively weaker towards the center, so that the ionic conductivity of the paths to the edges of the electrodes is substantially greater than that of the paths to the central regions of the electrodes.

Other features and advantages of the invention will be set forth in, or apparent from, the detailed description of the preferred embodiments of the invention found hereinbelow.

DESCRIPTION OF THE PREFERRED EMBODIMENTS

Figure 1:
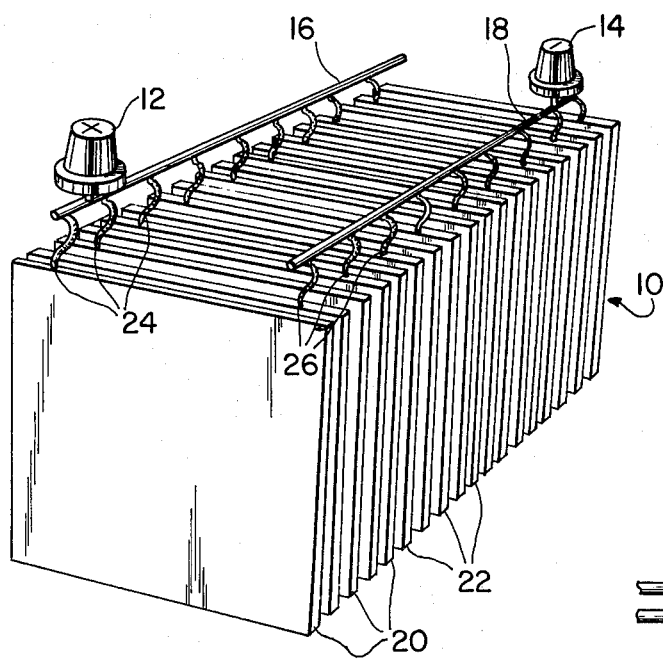
FIG. 1 is a perspective view of a plate-pack of secondary storage battery with the cover and separators removed.

Referring to FIG. 1, the plate-pack of a conventional secondary battery is shown with the casing and separators removed. The plate-pack, which is generally denoted 10, includes battery terminals 12 and 14, which are individually connected through bus bars 16 and 18 to a plurality of positive plates 20 and a plurality of negative plates 22, respectively. The connections between bus bar 16 and positive plates 20, and between bus bar 18 and negative plates 22, are made through suitable leads 24 and 26, respectively.

Before proceeding further, the basic make-up or construction of an electrochemical cell will be considered. Such a cell comprises electrodes, viz., at least one cathode corresponding to positive plates 20, and at least one anode corresponding to negative plates 22, and an electrolyte (not shown), all contained within a housing or casing. To make the cell more portable, the electrolyte, which is usually a liquid, is soaked up in a separator (not shown in FIG. 1) which thus acts similarly to a wet sponge. The electrodes (anodes and cathodes) comprise at least two parts, viz., the electronically conductive current conductor or plaque, and the "active material" deposited on or within the conductor. In secondary or rechargeable cells or batteries, such as are being considered here, the active material is used to give off (discharge) or take up (charge) energy repeatedly. The plaque facilitates charge and discharge by providing an easy (highly conductive) path between the active material and the external leads, corresponding to leads 24 and 26. The electrical circuit is completed within the cell between electrodes by the electrolyte, which is ionically conductive, in contrast to the electrodes, which are electrically conductive.

Figure 2:
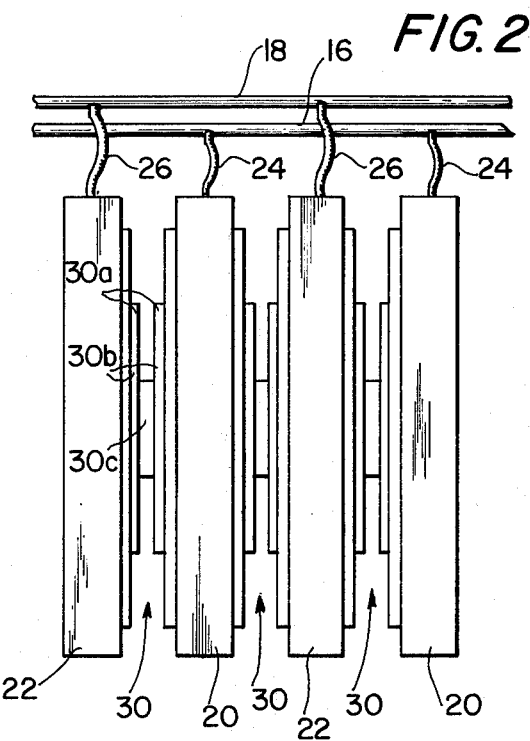
FIG. 2 is a diagrammatic representation, in side elevation, of a portion of a plate-pack illustrating a first embodiment of the invention.

Referring to FIG. 2, a first embodiment of the invention is illustrated. In accordance with this embodiment, separators 30 are disposed between the zinc anodes 22 and the cathodes 20, which separators are density profiled so as to control the ionic conductivity of the paths between the electrodes. The separators 30 are each formed by plates or discs of varying sizes, with the larger sized discs 30a being located adjacent to the respective electrodes and the intermediate sized discs 30b positioned between discs 30a and a center disc 30c. It is important to note that the discs 30a, 30b and 30c are normally compressed together. It might also be noted at this point that in FIG. 2, bus bars 16 and 18 are off-set in height for purposes of clarity. In any event, it will be appreciated that with the separators 30 formed as shown in FIG. 2, and the spaces between the separator discs filled with electrolyte, the ionic conductivity of the path between the electrodes is greater at the edges of the electrode and less at the center, because of the relatively greater amount of separator material at the center and relatively greater amount of electrolyte near the edges. Thus, current will be encouraged to flow to the edges of the electrodes, thereby combatting edge corrosion and shape change. It will, of course, be understood that the particular shape and arrangement of the separator disc should not be taken as limiting, and other shapes and arrangements can be used to produce the same end.

Figure 3:
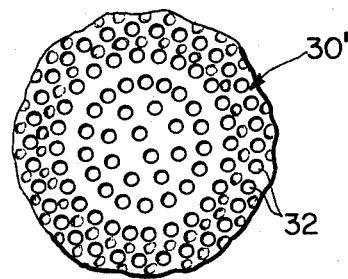
FIG. 3 is a front view of a separator constructed in accordance with a second embodiment of the invention.

Referring to FIG. 3, a portion of a separator constructed in accordance with a further embodiment of the invention is shown. In this embodiment, a separator, denoted 30', is provided which is of the porous type and includes a plurality of pores 32. As illustrated, the separator is constructed so as to be highly porous at the edge and less porous at the center so that, again, the ionic conductivity of the path between the electrodes is greater at the edge that at the center.

Figure 4:
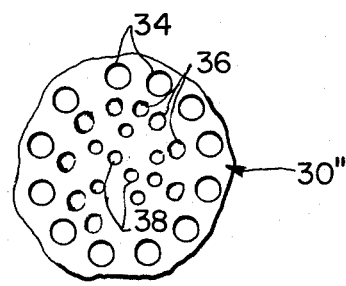
FIG. 4 is a front view, similar to FIG. 3, of a separator constructed in accordance with a third embodiment of the invention.

FIG. 4 illustrates a further embodiment which is similar to that of FIG. 3, but wherein pore sizes of a portion of a separator, denoted 30'', decrease toward the center. Thus, the size of the pores 34 at the edge of separator 30'' is larger than of the pores 36 adjacent thereto; and the latter pores are, in turn, larger than the pores 38, located at the center. Again, the effect is to provide a relatively high conductivity path to the edges of the electrodes, between which the separator is positioned and a relatively low conductivity path to the electrode centers.

Figure 5:
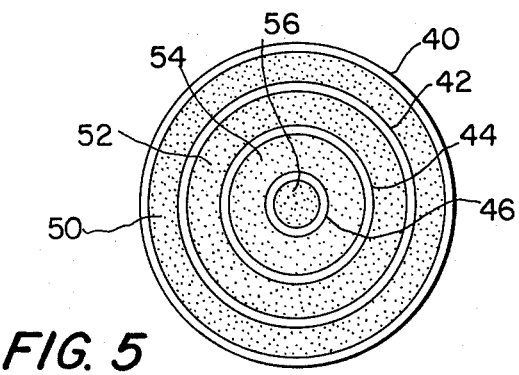
FIG. 5 is a front view of an electrolyte-containing separator arrangement for positioning between electrodes, wherein each annulus, in sequence, contains an electrolyte of decreasing strength, beginning with the strongest electrolyte in the outer annulus.

A further embodiment of the invention is illustrated schematically in FIG. 5. In this embodiment, the separator arrangement includes a plurality of spacer rings 40, 42, 44, and 46, which form annular electrolyte chambers 50, 52, 54 and central chamber 56. The strengths of the electrolytes in annular chambers 50, 52, 54 and central chamber 56 are made to be progressively weaker, proceeding from the outside toward the center, so that the electrolyte in outer chamber 50 is the strongest and that in central chamber 56 is the weakest. As before, the effect is to increase the ionic conductivity of the path between the edges of adjacent electrodes as compared with that of the path between the central portions of those electrodes.

It will be appreciated that the embodiments described above can be combined, and that characteristics, such as the size, quality and/or number of the ion paths and/or the strength and/or amount of electrolyte, can be used separately or in combination to provide the desired ionic conductivity profile.

Although the invention has been described relative to preferred embodiments thereof, it will be understood by those skilled in the art that modifications and variations can be effected in these embodiments without departing from the scope and spirit of the invention.

I claim:

1. In a secondary power source, comprising at least one rechargeable electrochemical cell, comprising a housing, at least one cathode electrode located within the housing, at least one zinc anode electrode located within the housing, a separator between the electrodes, and an electrolyte for enabling ion transfer between said electrodes, the improvement wherein said separator profiles the ionic conductivity between the electrodes so that ion flow is greatest at the edges of the electrodes and least at the center of the electrodes, so as to combat migration of the zinc ions of the anode electrode from the edge thereof to the center thereof.

2. A secondary power source as claimed in claim 1, wherein said separator is disposed between the electrodes and provides increased electrolyte in the region of the edges of the electrodes.

3. A secondary power source as claimed in claim 1, wherein said separator comprises a spacer arrangement disposed between the electrodes and defining a plurality of chambers containing electrolytes of different ionic conductivity.

4. A secondary power source as claimed in claim 1, wherein said separator comprises a porous separator.

5. A secondary power source as claimed in claim 2, wherein said separator comprises a plurality of separator discs of different sizes, said separator discs being compressed together and being arranged to provide a thicker portion at the center of the electrodes, and a thinner portion at the edges of the electrodes.

6. A secondary power source as claimed in claim 3, wherein said spacer arrangement comprises a plurality of concentric rings defining annular chambers therebetween, the ionic conductivity of the electrolytes in the annular chambers increasing progressively beginning at the center so that the electrolyte in the innermost annular chamber has the relatively lowest ionic conductivity and the outermost chamber has the highest ionic conductivity.

7. A secondary power source as claimed in claim 4, wherein the pores of said porous separator are of substantially the same size and said separator includes a substantially greater concentration of pores at the edges thereof than the center thereof.

8. A secondary power source as claimed in claim 4, wherein the pores of said separator are of different sizes and the larger pores are concentrated in the region of the separator which lies adjacent to the edges of the electrodes.

* * * * *

UNITED STATES PATENT AND TRADEMARK OFFICE
CERTIFICATE OF CORRECTION

PATENT NO. : 3,972,727
DATED : 8/3/76
INVENTOR(S) : Ernst M. Cohn

It is certified that error appears in the above-identified patent and that said Letters Patent are hereby corrected as shown below:

In the heading of the printed specification, correct the Inventor's first name by deleting "Ernest" and inserting --Ernst--

Signed and Sealed this

*Eighteenth* Day of *October 1977*

[SEAL]

*Attest:*

RUTH C. MASON
*Attesting Officer*

LUTRELLE F. PARKER
*Acting Commissioner of Patents and Trademarks*